Oct. 9, 1962 V. H. FISHER 3,057,041

AUTOMATIC ASSEMBLING MACHINES

Filed Jan. 15, 1959 3 Sheets-Sheet 1

INVENTOR.
VERNON H. FISHER
BY H. Vincent Harsha
ATTORNEY

Oct. 9, 1962 V. H. FISHER 3,057,041

AUTOMATIC ASSEMBLING MACHINES

Filed Jan. 15, 1959 3 Sheets-Sheet 2

INVENTOR.
VERNON H. FISHER

BY H. Vincent Harsha

ATTORNEY

AUTOMATIC ASSEMBLING MACHINES

INVENTOR.
VERNON H. FISHER
BY H. Vincent Harsha
ATTORNEY

United States Patent Office 3,057,041

Patented Oct. 9, 1962

3,057,041
AUTOMATIC ASSEMBLING MACHINES

Vernon H. Fisher, Watertown, Mass., assignor to Raytheon Company, a corporation of Delaware Filed Jan. 15, 1959, Ser. No. 787,020
4 Claims. (Cl. 29—25.19)

This invention relates generally to automatic assembling machines and more specifically to apparatus associated with such machines for placing electronic components within housings and for aligning the loosely assembled components for welding.

The primary object of this invention is to provide positive reliable apparatus in an assembling machine for placing an electronic component within a housing cap and to present the assembled parts in proper alignment for a final assembly operation by an automatic welder.

A specific object of this invention is to provide a positive apparatus in an assembling machine which will receive an electronic component from a suitable feed mechanism and which will automatically invert the component to drop the same into a housing cap on an indexing table of the assembling machine.

Another object of this invention is to provide a novel, positive work inverter mechanism for diode assembling machines wherein a diode received from a feed mechanism is inverted and dropped into a housing cap on an index table with its terminal leads projecting upwardly from the cap, and wherein the inverter mechanism is provided with a gate which is automatically opened to prevent damage to the leads when the index table is advanced to its next position.

A further object of this invention is to provide a positive erecting and seating mechanism for an automatic diode assembling machine wherein diodes dropped into housings positioned on the index table of the machine in loose assembly are automatically erected and seated in their housings as the index table advances the assembly to a welding station.

With the foregoing and other objects in view the invention resides in the following specification and appended claims, certain embodiments and details of construction of which are illustrated in the accompanying drawings in which:

Figure 1:
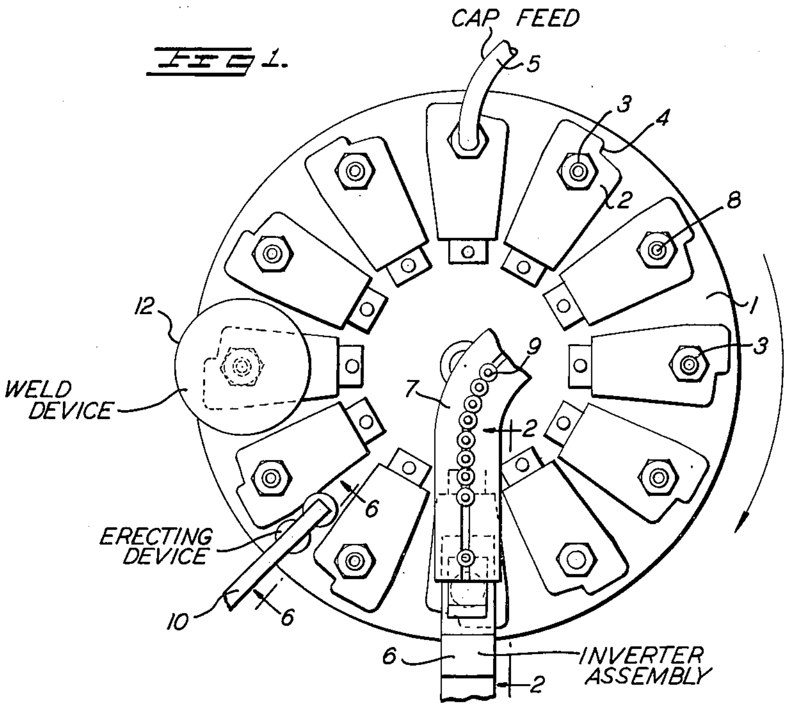
FIGURE 1 is a schematic layout of the automatic assembling machine comprising the invention.

Work positioning and indexing tables and their general operation in connection with the handling of various types of work pieces are well known in the prior art. For this reason and for purposes of clarity in the drawings only the portions of the assembling machine, namely the index table and portions of the parts feed mechanisms associated therewith, have been illustrated. This purpose will become apparent to one skilled in the art when considering that this invention is directed solely to apparatus for placing a part on the indexing table of such a machine and to cooperative apparatus for properly seating the part after placement on the table and prior to being indexed into a welding position.

By reference to FIGURE 1 which is a schematic plan view of the essential portions of the assembling machine in which the invention lies, it will be noted that an indexing table 1 is provided with a plurality of plates 2 which act as parts retainers on the table 1. Each plate 2 is perforated to provide a work receiving opening 3 which acts as a cradle to support parts fed to the table 1. The plates 2 are further provided with a notched cam surface 4 for a purpose to be later described.

Work pieces are fed to the table 1 through a tube 5 and are controlled in feed rate by an automatic means (not shown) which will place one part in a cradle or opening 3 each time the table 1 is indexed one step. This particular apparatus was designed specifically to feed diode housing caps 8 to the cradles with their flared open ends acting to engage the edges of the openings 3 and thereby be supported by the plates 2.

Displaced from the feed tube 5 and associated with one edge of table 1 is an inverter mechanism 6. The inverter mechanism receives electronic components such as diodes 9 or other parts from a feed track 7, operating under an automatic control (not shown), and inverts and places such parts into a housing cap 8. As illustrated the terminus of the feed track 7 is positioned above the table 1 and is directed toward one edge thereof to align with inverter 6.

When the table 1 is indexed in the direction of the arrow, a diode 9 placed in a cap 8 by the inverter mechanism 6 is advanced to a diode seating and erecting mechanism 10. The purpose of the mechanism 10 is to make certain that the diode 9 is properly seated in the cap 8 and that the diode leads 11 are vertically directed upwardly from the plate 1. Only when thus positioned can the automatic welder mechanism 12 function properly to weld the diode 9 to its housing cap 8. Between the welder mechanism 12 and the cap feed tube 5 an ejector mechanism (not shown) is provided to remove the completed units from the table 1.

Now referring more particularly to FIGURES 2, 3, 4 and 5 the manner of receiving and handling the diodes 9 in the inverter mechanism 6 will become apparent. The diodes 9 are gravity fed down track 7 to an escapement mechanism 13. Each time the table 1 is indexed, the escapement 13 is operated by means (not shown) to permit one diode 14 to proceed down track 7 to the inverter bar 15. The bar 15 is provided with a longitudinal recess 16. Recess 16 is provided with a pair of inwardly directed shoulders 17. These shoulders 17 are directly in line with the terminus of track 7 when the bar 15 is in the position illustrated in FIGURE 2. Thus a diode will move by gravity from the track 7 into recess 16, and the header portion 18 of the diode will be supported on the shoulders 17 of the recess.

Figure 2:
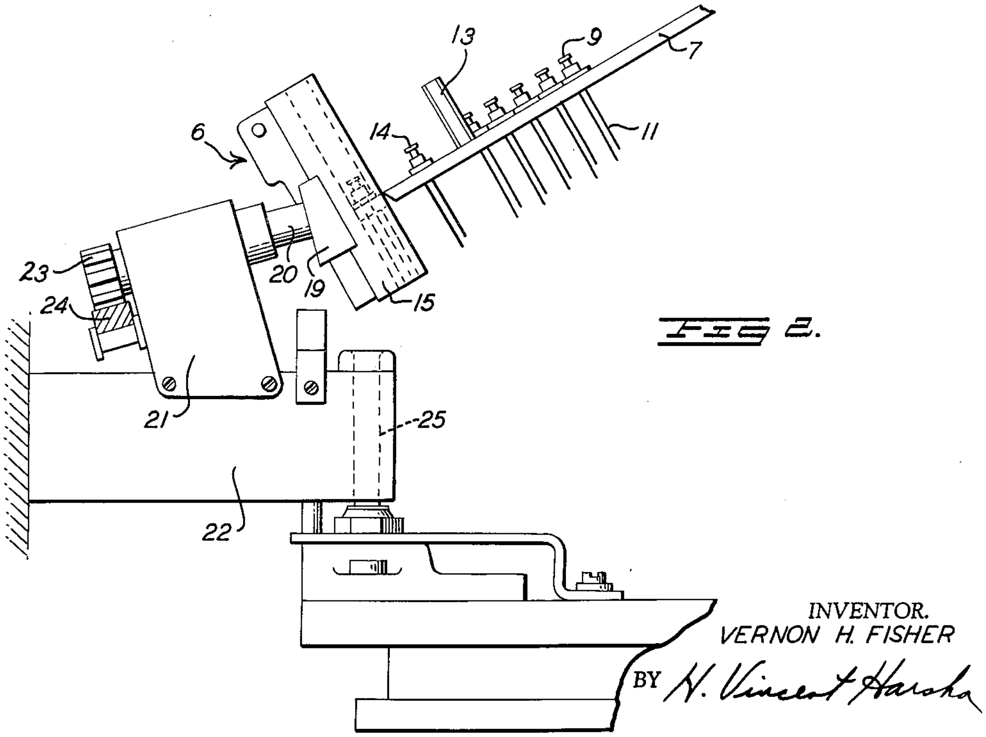
FIGURE 2 is a view in side elevation of the inverter mechanism of the assembling machine receiving an electronic component such as a diode from a feed mechanism.
Figure 3:
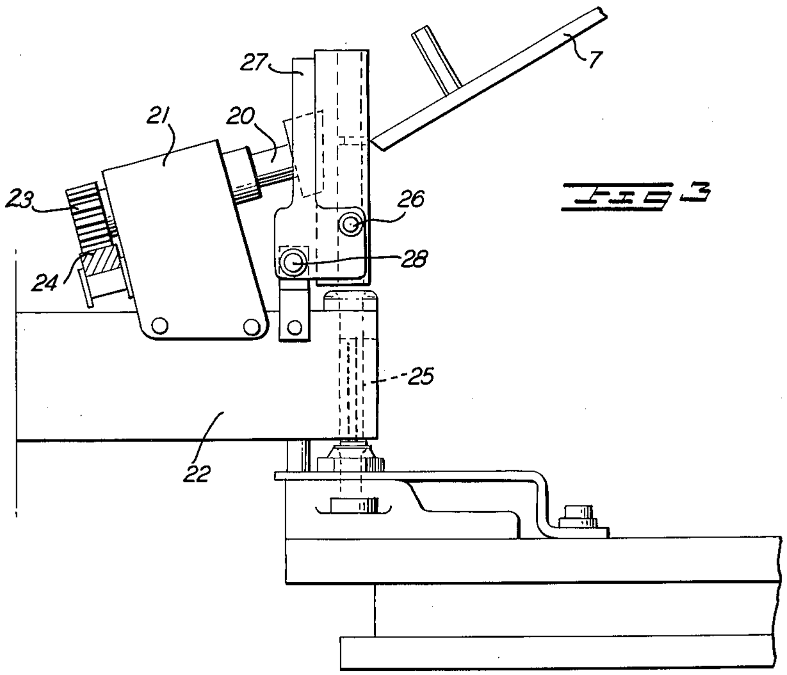
FIGURE 3 is a view in side elevation of the inverter mechanism in a rotated position to deliver a diode or other component into a housing cradled on the indexing table of the assembling machine.

The inverter bar 15 is carried by a block member 19 which is in turn supported on and is rotatable by a shaft 20. The shaft 20 is supported by a bracket 21 from and above a guide tube member 22 which is secured to the assembly machine supporting structure (not shown). A pinion 23 is mounted on the end of shaft 20 and engages a rack 24 which, when reciprocated in either direction, will drive pinion 23 to rotate the shaft 20. The shaft 20 is mounted at such an angle by bracket 21 and the bar 15 is carried at such an angle by block 19 that on rotation of the bar 15 from the position of FIGURE 2 to that of FIGURE 3 the recess 16 will become vertically aligned with a guide tube 25 formed in guide member 22. This will occur when the angle that the shaft 20 makes with the horizontal is half the angle that the bar 15 makes with the vertical when in the positions as shown in FIGURE 2. As illustrated in the drawings the guide tube 25 is aligned with openings 3 in cap supporting plates 2.

Figure 4:
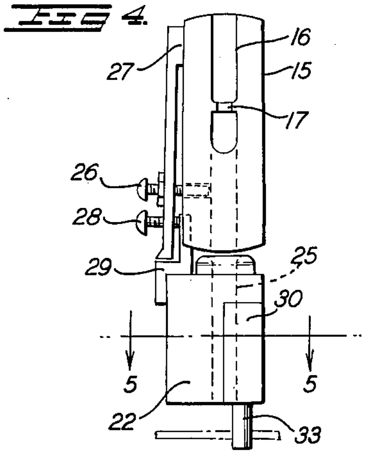
FIGURE 4 is a front view of the inverter bar and the guide tube associated therewith of the inverter mechanism illustrated in FIGURE 3.

As the inverter bar 15 is rotated, it is necessary to prevent a diode carried thereby from sliding prematurely from recess 16. This action is prevented by a stop pin 26 projecting freely into recess 16 through one side of bar 15. The pin 26 is secured to a spring plate 27. The plate 27 is secured at its upper end as viewed in FIGURE 4 against the side of bar 15 by welding or other suitable means. A release pin 28 is also secured to plate 27. Secured on the upper surface of guide member 22 is a stop bar 29. This bar 29 is mounted in such a position as to be engaged by release pin 28 as the inverter bar reaches the proper drop position for a diode carried thereby. Thus when pin 28 is out of engagement with bar 29 the spring plate 27 projects the stop pin 26 into recess 16 far enough to prevent a premature drop of a diode. When pin 28 engages bar 29 the plate 27 is flexed away from bar 15 enough to pull stop pin 26 from the path of a diode, thereby permitting it to drop by gravity into the guide tube 25. The release time for a diode may be varied by making the mounting of pin 28 on plate 27 adjustable. The position of the inverter bar 15 in FIGURE 4 is that where the pin 28 has engaged the bar 29 to remove pin 26 from recess 16 thus making it possible for a diode to fall freely into guide tube 25.

Figure 5:
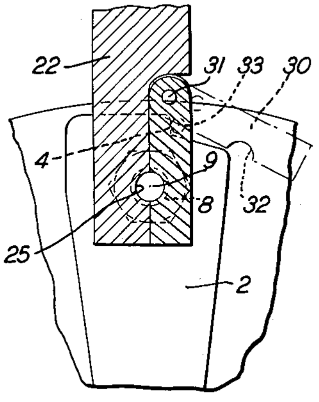
FIGURE 5 is a view of the inverter guide tube portion of the inverter mechanism taken along the lines 5—5 of FIGURE 4.

The guide tube 25 on guide member 22 is best illustrated in FIGURE 5. When a diode 9 has been dropped into a cap 8 by the inverter 6, its leads 11 are projecting upwardly in tube 25. If permitted to remain this way while the table 1 is indexed another step, it is obvious that the leads would be bent over. To compensate for this a gate 30 illustrated in both full and dotted lines in FIGURE 5 is mounted on a spring pivot 31 on the underside of guide member 22. The gate 30 is normally biased to a closed position and an inner recessed portion 32 thereof forms a complementary portion of the guide tube 25. Integral with and depending from the underside of gate 30 is a cam follower 33 which engages cam 4 on each plate 2 as it is indexed by table 1 under the inverter mechanism 6. When the next indexing operation occurs, the cam 4 acts against follower 33 to open gate 30 against its spring biased pivot mounting so that a diode carried by plate 2 may move from the confines of tube 25 in non-obstructed fashion to its next position. Hence the leads 11 of a diode 9 are protected from any engagement with the guide member 22 when indexed away therefrom.

Figure 6:
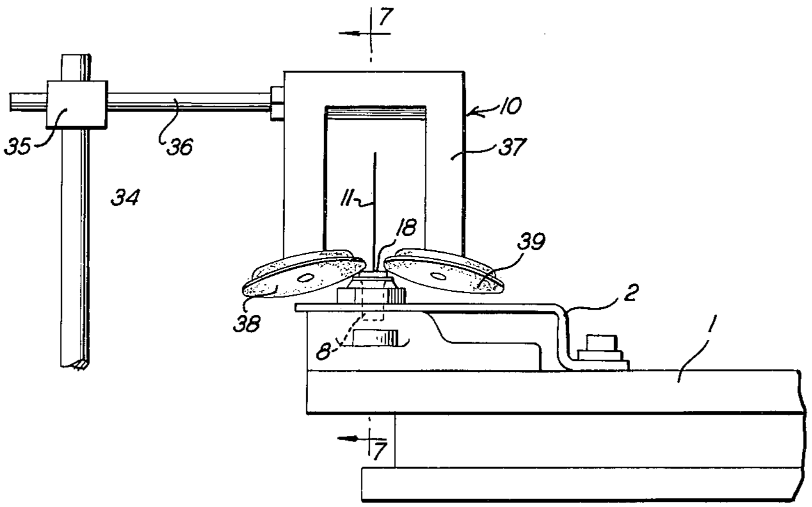
FIGURE 6 is a view in front elevation of the erecting and seating mechanism of the invention which is positioned adjacent the upper surface of the indexing table of the assembling machine.
Figure 8:
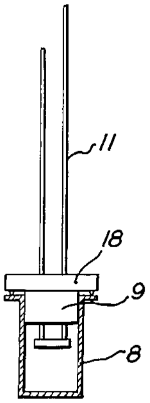
FIGURE 8 is a partially sectioned view in side elevation of a completed diode assembly produced on the machine of this invention.
Figure 7:
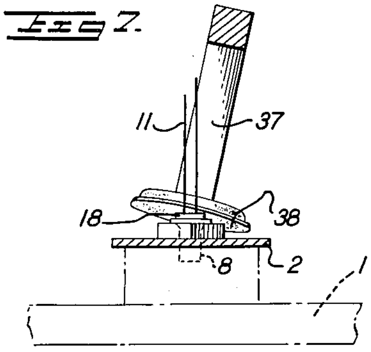
FIGURE 7 is a sectioned view of the erecting and seating mechanism of the invention taken along the lines 7—7 of FIGURE 6.

In dropping a diode 9 into a cap 8 at the inverter station there is no assurance that the header portion 18 of the diode is properly seated on the mouth of the cap. If the diode is not properly supported, then the leads 11 will not be substantially vertical which they should be at the welding station. To properly erect and seat the diode in the event that it is cocked, the mechanism 10 illustrated in FIGURES 6 and 7 is provided. This mechanism is located between indexing stations and is positioned between the inverting station and the welding station as illustrated in FIGURE 1. The mechanism 10 includes a mounting post which is suitably secured to the machine proper by means not shown. Vertically and horizontally adjustably mounted on post 34 by a clamp 35 is a bar 36. Attached by suitable means to bar 36 is a U-shaped bracket 37 which depends downwardly over index table 1. Mounted at the open extremity of each leg of bracket 37 is a rotatable disc 38 and 39, which may be of flexible nylon or other suitable material. Each disc is mounted in bearings so as to be freely rotatable. The discs 38 and 39 are slightly spaced from each other and are mounted at a facing angle to each other. Both discs are angled upwardly toward the left or the direction toward the inverter mechanism 6 as viewed in FIGURE 7. Thus when a diode 9 passes through mechanism 10, the diode header 18 may pass under the leading edges of discs 38 and 39 no matter how cocked the position of the diode 9 in its cap 8 may be. As the table continues to move the diode, the discs will contact the header 18 from either side and somewhat along the leading edge thereof to properly erect the diode and to properly seat the same in its cap 8. With the diode thus properly seated the unit is ready for sealing at the juncture between the header 18 and cap 8 by the automatic welder 12, details of which are not illustrated.

The entire operation of the assembling machine as far as is pertinent to this invention should now be apparent to one skilled in the art. Diode caps 8 with their open ends facing upward are deposited on the cradles 3 on index table 1. The table moves in the direction of the arrow in FIGURE 1 to present an open supported cap 8 under inverter bar 15 and guide tube 25. As the table moves a cap under the tube 25 the bar 15 is rotated to drop a diode 9 into cap 8. Upon the next indexing step of the table, the cam 4 acts on follower 33 to open the guide tube gate 30 permitting the diode leads 11 to leave the vicinity of the guide tube 25 without becoming bent. The deposited diode 9 resting in cap 8 may be cocked, and to ascertain proper substantially vertical positioning of the leads 11 and the proper seating of the header 18 on cap 8, the erecting and seating mechanism 10 is provided between indexing stations. The momentum of the table 1 carrying the diode 9 causes the header 18 thereof, if cocked, to engage the inclined undersurfaces of rotatable discs 38 and 39 which act to properly reseat the header on the cap 8. If no correction is necessary, it is obvious that the leads will pass directly between discs 38 and 39 which will still provide a seating force.

It is to be understood that the feed mechanisms for the caps and diodes and the operating mechanisms for the table and the inverter are correlated to act simultaneously in preselected timed agreement. This mechanism forming no part of the invention and not being considered pertinent thereto has not been illustrated.

It is obvious that the structural details of the inverting and erecting mechanisms might be subjected to various modifications well within the purview of this inventor who intends only to be bound to a reasonable interpretation of the scope of the appended claims.

I claim:

1. An automatic diode assembling machine comprising an indexing table with a plurality of work supporting cradles, means to feed an open cap to each supporting cradle as it becomes indexed under said feed means, means to feed diodes with depending leads to a position above the table and toward one edge thereof, inverter means to receive one diode at a time from said diode feed means and to invert the same for a free gravity fall, guide tube means associated with said inverter means to guide a diode into a cap positioned beneath the guide tube by the indexing table, and means associated with said indexing table to properly seat said diode on said cap after the table has moved the diode and cap assembly from the vicinity of the guide tube, said seating means including rotatable means for engaging said second work piece at two oppositely disposed points.

2. An automatic diode assembling machine comprising an indexing table with a plurality of work supporting cradles, means to feed an open ended diode housing cap to each supporting cradle as it becomes indexed under said feed means, means to feed diodes with depending leads to a position above the table and toward one edge thereof, inverter means secured to said machine and positioned to receive one diode at a time from said diode feed means and to invert the same for a free gravity fall, means to prevent a free fall of a diode in said inverter means until said diode has been substantially completely inverted, means to release said preventing means as said diode approaches complete inversion, guide tube means associated with said inverter means to guide a diode into a diode cap positioned beneath said guide tube by the indexing table, said guide tube having a biased, normally closed gate, means associated with said gate and said indexing table to cause said gate to open on each indexing movement of the table to permit advancing, unobstructed movement of the diode positioned on the cap with its leads directed upwardly relative to the table, and rotatable means to engage said diodes at two oppositely disposed points to properly seat the same when improperly seated on said caps after the table has moved the diode and cap assembly from the vicinity of the guide tube.

3. An automatic diode assembling machine comprising an indexing table with a plurality of work supporting cradles, means to feed an open ended diode housing cap to each supporting cradle as it becomes indexed under said feed means, means to feed diodes with depending leads to a position above the table and toward one edge thereof, inverter means secured to said machine and positioned to receive one diode at a time from said diode feed means and to invert the same for a free gravity fall, means to prevent a free fall of a diode in said inverter means until said diode has been substantially completely inverted, means to release said preventing means as said diode approaches complete inversion, guide tube means associated with said inverter means to guide a diode into a diode cap positioned beneath said guide tube by the indexing table, said guide tube having a biased, normally closed gate, means associated with said gate and said indexing table to cause said gate to open on each indexing movement of the table to permit advancing, unobstructed movement of the diode positioned on the cap with its leads directed upwardly relative to the table, a pair of spaced, freely rotatable discs, inclined toward each other and both being inclined in a direction opposite to the line of movement of said indexing table, and means to support the discs above the indexing table so that erect diode leads may pass freely through the spacing between said discs while diodes improperly seated on their caps in the guide tube will engage the under surfaces of said discs to cause a corrective adjustment of the seating of said diodes and move their leads to an erect position, and means to engage said diodes and properly seat the same when improperly seated on said caps after the table has moved the diode and cap assembly from the vicinity of the guide tube.

4. An automatic diode assembling machine comprising an indexing table for feeding loose assemblies of a diode and a cap therefor to a welding station, said table including a plurality of work supporting cradles, means to feed diode caps one at a time to a cradle on said table at one work station, means to feed diodes with straight depending leads to a position above the cradles of the table at a subsequent work station, means to receive diodes individually from said diode feed means and to deposit them in inverted position in said caps with said diode leads being now directed upwardly, and positive seating and lead erecting means mounted on said machine to engage cocked diodes at two oppositely disposed points and properly seat the same as the indexing table moves said loose diode assemblies between the diode receiving work station and the welding station.

References Cited in the file of this patent

UNITED STATES PATENTS 2,120,877 Uber ------------------ June 14, 1938